(12) United States Patent
Chance et al.

(10) Patent No.: US 10,171,126 B2
(45) Date of Patent: Jan. 1, 2019

(54) APPARATUS FOR UPLINK MULTI-ANTENNA COMMUNICATION BASED ON A HYBRID COUPLER AND A TUNABLE PHASE SHIFTER

(71) Applicant: Intel IP Corporation, Santa Clara, CA (US)

(72) Inventors: Gregory Chance, Oberhaching (DE); Nebil Tanzi, Hoffman Estates, IL (US)

(73) Assignee: Intel IP Corporation, Santa Clara, CA (US)

( * ) Notice: Subject to any disclaimer, the term of this patent is extended or adjusted under 35 U.S.C. 154(b) by 366 days.

(21) Appl. No.: 14/841,034

(22) Filed: Aug. 31, 2015

(65) Prior Publication Data

US 2017/0062897 A1    Mar. 2, 2017

(51) Int. Cl.
*H01Q 3/00* (2006.01)
*H04B 1/52* (2015.01)

(52) U.S. Cl.
CPC ..................................... *H04B 1/52* (2013.01)

(58) Field of Classification Search
None
See application file for complete search history.

(56) References Cited

U.S. PATENT DOCUMENTS

| | | | | |
|---|---|---|---|---|
| 7,280,084 B2* | 10/2007 | Herbert | ................. | H01Q 1/246 343/850 |
| 8,063,822 B2* | 11/2011 | Adams | ................... | H01Q 1/246 342/368 |
| 8,362,955 B2* | 1/2013 | Adams | ................... | H01Q 1/246 342/368 |
| 8,912,957 B2* | 12/2014 | Lin | ......................... | H01Q 25/00 342/368 |
| 9,344,176 B2* | 5/2016 | Barker | ................ | H04B 7/0617 |
| 9,673,882 B2* | 6/2017 | Ai | ........................ | H04B 7/0617 |

(Continued)

FOREIGN PATENT DOCUMENTS

WO    2017040025    3/2017

OTHER PUBLICATIONS

"International Application Serial No. PCT US2016 047138, International Preliminary Report on Patentability dated Mar. 27, 2018", 10 pgs.

(Continued)

*Primary Examiner* — Tuan A Tran
(74) *Attorney, Agent, or Firm* — Schwegman Lundberg & Woessner, P.A.

(57) ABSTRACT

Embodiments of front-end module (FEM) circuitry and a communication device are generally described herein. In some embodiments, the FEM circuitry may be configured to provide uplink (UL) multiple-input multiple-output (MIMO) signals and/or UL carrier aggregation (CA) signals for transmission by the communication device. The FEM circuitry may comprise a hybrid coupler to generate a first antenna transmit signal and a second antenna transmit signal. The FEM circuitry may further comprise one or more tunable phase shifters. In some embodiments, the phase shifters may phase-shift a first radio frequency (RF) signal and a second RF signal according to a 90 degree phase difference to generate the hybrid coupler input signals. Accordingly, the antenna transmit signals may be transmitted according to the UL-MIMO configuration.

16 Claims, 8 Drawing Sheets

(56) References Cited

U.S. PATENT DOCUMENTS

| | | | |
|---|---|---|---|
| 2013/0147664 A1* | 6/2013 | Lin | H01Q 25/00 |
| | | | 342/372 |
| 2013/0201882 A1 | 8/2013 | Bauder et al. | |
| 2013/0244594 A1 | 9/2013 | Alrabadi et al. | |
| 2013/0285763 A1 | 10/2013 | Granger-Jones et al. | |
| 2014/0199956 A1 | 7/2014 | Wilkerson | |
| 2014/0313947 A1 | 10/2014 | Ali-ahmad | |

OTHER PUBLICATIONS

"International Application Serial No. PCT/US2016/047138, International Search Report dated Nov. 18, 2016", 3 pgs.

"International Application Serial No. PCT/US2018/047138, Written Opinion dated Nov. 18, 2016", 8 pgs.

\* cited by examiner

APPARATUS FOR UPLINK MULTI-ANTENNA COMMUNICATION BASED ON A HYBRID COUPLER AND A TUNABLE PHASE SHIFTER

TECHNICAL FIELD

Some embodiments pertain to uplink multiple-input multiple-output (MIMO) communication. Some embodiments pertain to uplink carrier aggregation (CA) communication. Some embodiments relate to uplink transmit diversity, including equal and unequal splitting of transmit power on multiple antennas. Some embodiments relate to hybrid couplers. Some embodiments relate to tunable phase shifters. Some embodiments relate to wireless networks, including those operating in accordance with the IEEE 802.11 family of standards or Third Generation Partnership Project (3GPP) standards. Some embodiments relate to wireless devices, including devices configured to operate in such networks. Some embodiments relate to communication devices for wireless and/or wired communication.

BACKGROUND

Communication devices configured to operate in a wireless network may communicate with a base station over allocated frequency spectrum for the network. As the spectrum may be limited, in some cases, additional spectrum may be allocated to the network to accommodate throughput demands for the devices. As an example, the spectrum may include multiple frequency bands that may not necessarily be contiguous in frequency. Such scenarios may provide design challenges for uplink transmissions and other operations. As another example, the devices may use multiple transmit antennas to realize an increase in throughput and/or a diversity benefit. Accordingly, there is a need for devices and components that support transmissions on multiple antennas and/or transmissions in multiple frequency bands in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
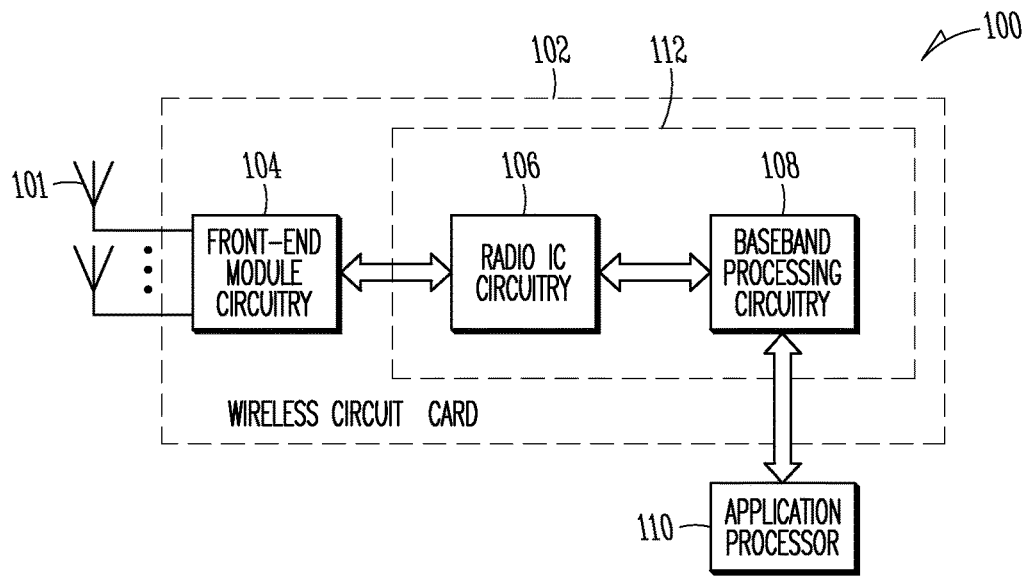
FIG. 1 is a block diagram of a radio architecture system in accordance with some embodiments.

FIG. 1 is a block diagram of a radio architecture system 100 in accordance with some embodiments. Radio architecture system 100 may include front-end module circuitry 104, radio IC circuitry 106 and baseband processing circuitry 108. Front-end module circuitry 104 may include a receive signal path which may include circuitry configured to operate on RF signals received from one or more antennas 101, amplify the received signals and provide the amplified versions of the received signals to the radio IC circuitry 106 for further processing. Front-end module circuitry 104 may also include a transmit signal path which may include circuitry configured to amplify signals for transmission provided by the radio IC circuitry 106 for transmission by one or more of the antennas 101.

Radio IC circuitry 106 may include a receive signal path which may include circuitry to down-convert RF signals received from the front-end module circuitry 104 and provide baseband signals to the baseband processing circuitry 108. Radio IC circuitry 106 may also include a transmit signal path which may include circuitry to up-convert baseband signals provided by the baseband processing circuitry 108 and provide RF output signals to the front-end module circuitry 104 for subsequent transmission.

Baseband processing circuity 108 may include one or more processors and control logic to process the baseband signals received from the receive signal path of the radio IC circuitry 106 and to generate the baseband signals for the transmit signal path of the radio IC circuitry 106. Baseband processing circuity 108 may interface with applications processor 110 for generation and processing of the baseband signals and for controlling operations of the radio IC circuitry 106.

In some embodiments, the antennas 101, the front-end module circuitry 104, the radio IC circuitry 106, and baseband processing circuitry 108 may be provided on a single circuit card, such as wireless circuit card 102, although the scope of the embodiments is not limited in this respect. In some other embodiments, the antennas 101, the front-end module circuitry 104 and the radio IC circuitry 106 may be provided on a single circuit card. In some embodiments, the radio IC circuitry 106 and the baseband processing circuitry 108 may be provided on a single chip or integrated circuit (IC), such as IC 112, although the scope of the embodiments is not limited in this respect.

Figure 2:
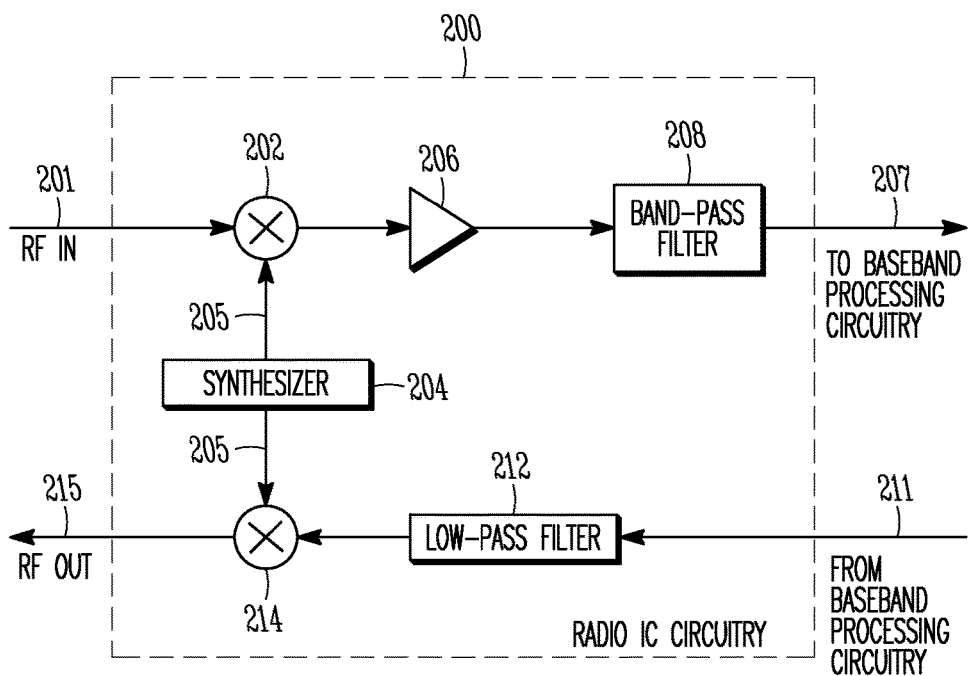
FIG. 2 illustrates radio IC circuitry in accordance with some embodiments.

FIG. 2 illustrates radio IC circuitry 200 in accordance with some embodiments. The radio IC circuitry 200 is one example of circuitry that may be suitable for use as the radio IC circuitry 106 (FIG. 1), although other circuitry configurations may also be suitable. In some embodiments, the radio IC circuitry 200 may include a receive signal path and a transmit signal path. The receive signal path of the radio IC circuitry 200 may include at least mixer circuitry 202, amplifier circuitry 206 and filter circuitry 208. The transmit signal path of the radio IC circuitry 200 may include at least filter circuitry 212 and mixer circuitry 214. Radio IC circuitry 200 may also include synthesizer circuitry 204 for synthesizing a frequency 205 for use by the mixer circuitry 202 and the mixer circuitry 214.

In some embodiments, mixer circuitry 202 may be configured to down-convert RF signals 201 received from the front-end module circuitry 104 (FIG. 1) based on the synthesized frequency 205 provided by synthesizer circuitry 204. The amplifier circuitry 206 may be configured to amplify the down-converted signals and the filter circuitry 208 may be a band-pass filter (BPF) configured to remove unwanted signals from the down-converted signals to generate output baseband signals 207. Output baseband signals 207 may be provided to the baseband processing circuitry 108 (FIG. 1) for further processing. In some embodiments, the output baseband signals 207 may be zero-frequency baseband signals, although this is not a requirement. In some embodiments, mixer circuitry 202 may comprise passive mixers, although the scope of the embodiments is not limited in this respect.

In some embodiments, the mixer circuitry 214 may be configured to up-convert input baseband signals 211 based on the synthesized frequency 205 provided by the synthesizer circuitry 204 to generate RF output signals 215 for the front-end module circuitry 104. The baseband signals 211 may be provided by the baseband processing circuitry 108 and may be filtered by filter circuitry 212. The filter circuitry 212 may include a low-pass filter (LPF), although the scope of the embodiments is not limited in this respect.

In some embodiments, the output baseband signals 207 and the input baseband signals 211 may be analog baseband signals, although the scope of the embodiments is not limited in this respect. In some alternate embodiments, the output baseband signals 207 and the input baseband signals 211 may be digital baseband signals. In these alternate embodiments, the radio IC circuitry may include analog-to-digital converter (ADC) and digital-to-analog converter (DAC) circuitry. In some dual-mode embodiments, a separate radio IC circuitry may be provided for processing signals for each spectrum, although the scope of the embodiments is not limited in this respect.

Figure 3:
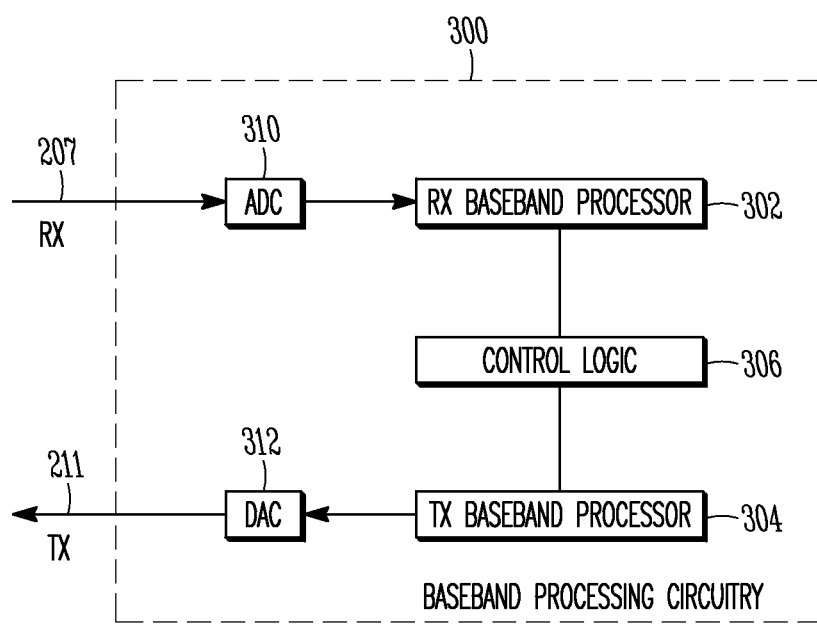
FIG. 3 illustrates a functional block diagram of baseband processing circuitry in accordance with some embodiments.

FIG. 3 illustrates a functional block diagram of baseband processing circuitry 300 in accordance with some embodiments. The baseband processing circuitry 300 is one example of circuitry that may be suitable for use as the baseband processing circuitry 108 (FIG. 1), although other circuitry configurations may also be suitable. The baseband processing circuitry 300 may include a receive baseband processor (RX BBP) 302 for processing receive baseband signals 207 provided by the radio IC circuitry 106 (FIG. 1) and a transmit baseband processor (TX BBP) 304 for generating transmit baseband signals 211 for the radio IC circuitry 106. The baseband processing circuitry 300 may also include control logic 306 for coordinating the operations with the baseband processing circuitry 300.

In some embodiments (e.g., when analog baseband signals are exchanged between the baseband processing circuitry 300 and the radio IC circuitry 106), the baseband processing circuitry 300 may include ADC 310 to convert analog baseband signals received from the radio IC circuitry 106 to digital baseband signals for processing by the RX BBP 302. In these embodiments, the baseband processing circuitry 300 may also include DAC 312 to convert digital baseband signals from the TX BBP 304 to analog baseband signals.

Referring to FIG. 1, in some embodiments, the antennas 101 (FIG. 1) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the radio architecture system 100 may be part of a communication device such as a wireless local area network (WLAN) communication station (STA), a wireless access point (AP), user equipment (LIE), an Evolved Node-B (eNB), a base station or a mobile device including a Wireless Fidelity (Wi-Fi) device. In some embodiments, some or all of the radio architecture system 100 may be part of an apparatus for such a communication device. In some embodiments, radio architecture system 100 may be configured to transmit and receive signals in accordance with specific communication standards, such as the Institute of Electrical and Electronics Engineers (IEEE) standards including IEEE 802.11-2012, 802.11n-2009, 802.11ac, and/or 802.11ax standards and/or proposed specifications for WLANs. In some embodiments, radio architecture system 100 may be configured to transmit and receive signals in accordance with Third Generation Partnership Project (3GPP) standards including Long Term Evolution (LTE) standards. The scope of the embodiments is not limited in this respect, however, as the radio architecture system 100 may also be suitable to transmit and/or receive communications in accordance with other techniques and standards. In addition, the radio architecture system 100 may be configured to transmit and receive signals in multiple frequency bands in some embodiments.

In some embodiments, the radio architecture system 100 may be part of a communication device such as a personal digital assistant (PDA), a laptop or portable computer with wireless communication capability, a web tablet, a wireless telephone, a smart-phone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the communication device may include one or more of a keyboard, a display, a non-volatile memory port, multiple antennas, a graphics processor, an application processor, speakers, and other mobile device elements. The display may be an LCD screen including a touch screen.

The communication device may be or may be configured to operate as a mobile device and/or a stationary non-mobile device. The communication device may also be, or may be part of, an apparatus for such a device. For instance, an AP may include the communication device in addition to other equipment, components or elements. It should also be noted that some embodiments may be related to other electrical devices, electrical circuits or other devices that may or may not be related to communication, as will be described below.

In accordance with embodiments, the FEM circuitry 104 may be configured to provide uplink multiple-input multiple-output (UL-MIMO) signals and/or uplink carrier aggregation (UL-CA) signals for transmission by the communication device. The FEM circuitry 104 may comprise a hybrid coupler to generate a first antenna transmit signal and a second antenna transmit signal. The FEM circuitry 104 may further comprise one or more tunable phase shifters. As an example, the phase shifters may phase-shift a first radio frequency (RF) signal and a second RF signal according to a 90 degree phase difference to generate the hybrid coupler input signals. Accordingly, the antenna transmit signals may be transmitted according to the UL-MIMO configuration. These embodiments will be described in more detail below.

Figure 4:
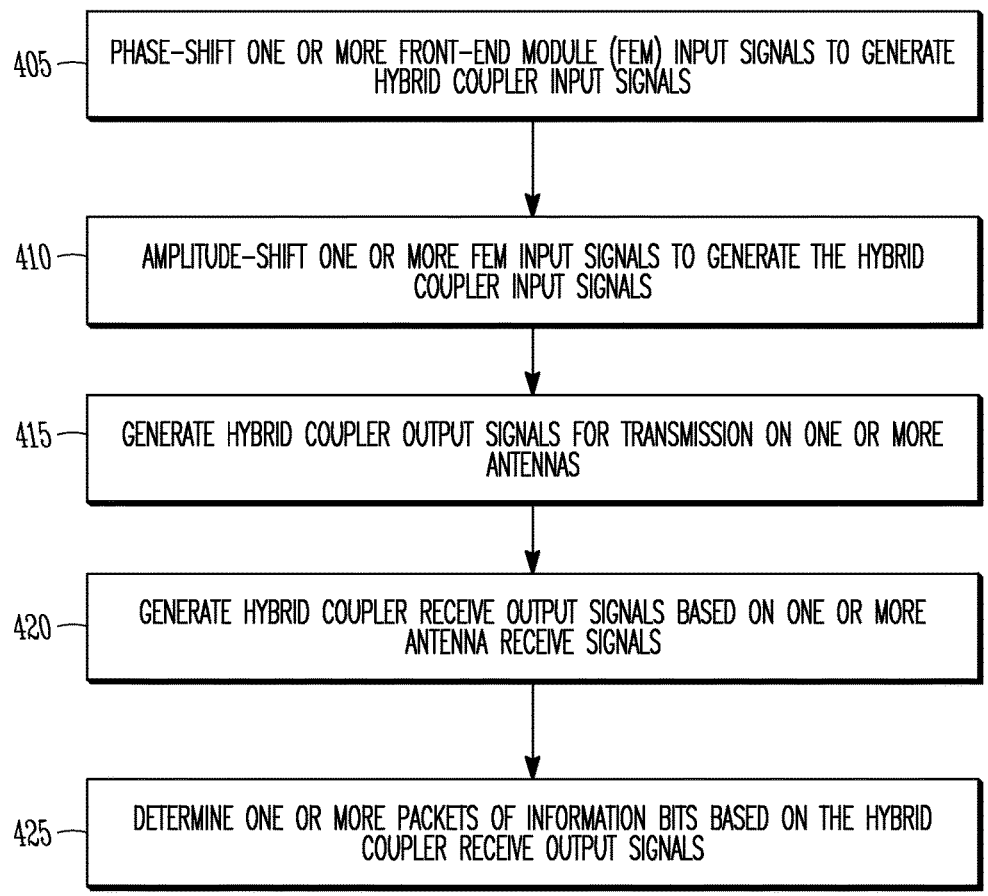
FIG. 4 illustrates the operation of a method of multi-antenna communication in accordance with some embodiments.

FIG. 4 illustrates the operation of a method of multi-antenna communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-13, although it is understood that the method 400 may be practiced with any other suitable systems, interfaces and components.

In addition, while the method 400 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). In addition, the method 400 and other methods described herein may be practiced by wireless devices configured to operate in other suitable types of wireless communication systems, including systems configured to operate according to various IEEE standards such as IEEE 802.11. The method 400 and other methods described herein may also be applicable to an apparatus for a UE 102 and/or eNB 104 or other device described above.

At operation 405 of the method 400, one or more front-end module (FEM) input signals may be phase-shifted to generate one or more hybrid coupler input signals. In some embodiments, one or more FEM input signals may be input to one or more tunable phase shifters, which may provide phase shifts to the FEM input signals according to a particular set of specified phase shifts (which may include one or more phase shifts of zero). The phase shifter outputs may be sent to a hybrid coupler, which may be included in the FEM circuitry in some cases. As will be described below, various configurations and/or phase-shift settings may be used to enable UL-MIMO, UL-CA, UL transmit diversity and/or other configurations.

As a non-limiting example, a first FEM input signal may be input to both a first and a second tunable phase shifter to provide first and second hybrid coupler input signals. As another non-limiting example, the first FEM input signal and a second FEM input signal may be input to the tunable phase shifters to provide the first and second hybrid coupler input signals. As another non-limiting example, the first tunable phase shifter may be tuned to provide a phase shift of zero while the second tunable phase shifter may be varied. It should be pointed out that the scope of embodiments is not limited to these examples in terms of the number of FEM input signals, phase shifters, and hybrid coupler input signals.

At operation 410, the FEM input signals may be amplitude-shifted by one or more amplitude shifters as part of the generation of the hybrid coupler input signals. The amplitude-shifting may enable one or more of the FEM input signals or other signals to be scaled and/or tuned to a particular value. Such values may include any suitable range of values and may include 1.0 and/or 0.0 in some cases. In some embodiments, the amplitude-shifting may be performed in addition to the phase-shifting of operation 405 in some cases. It should also be noted that some embodiments of the method 400 may not include the amplitude-shifting operation 410.

Embodiments are not limited to any particular ordering of the operations 405 and 410. As an example, the amplitude-shifting may be performed prior to the phase-shifting, in which case the outputs of the amplitude shifters may be sent to the phase shifters to generate the hybrid coupler input signals. As another example, the amplitude-shifting may be performed after the phase-shifting, in which case the outputs of the phase shifters may be sent to the amplitude shifters to generate the hybrid coupler input signals. As another example, the amplitude-shifting and phase-shifting operations may be performed jointly. In some embodiments, as will be described below, amplitude-shift settings may be used in addition to phase-shift settings as part of the previously described configurations and/or settings used to enable the UL-MIMO, UL-CA, UL transmit diversity and/or other configurations.

Figure 5:
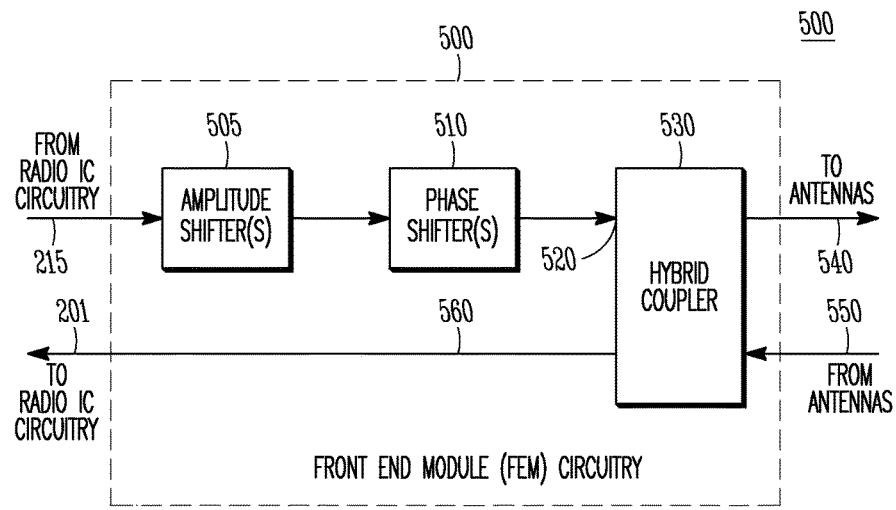
FIG. 5 illustrates an example of FEM circuitry in accordance with some embodiments.

FIG. 5 illustrates an example of FEM circuitry in accordance with some embodiments. The front-end module circuitry 500 is one example of circuitry that may be suitable for use as the FEM circuitry 104 (FIG. 1), although other circuitry configurations may also be suitable. The FEM circuitry 500 may include a receive signal path and a transmit signal path. In some embodiments, the FEM circuitry 500 may be configured to operate in multiple frequency bands. As a non-limiting example, either the 2.4 GHz frequency spectrum or the 5 GHz frequency spectrum may be used. As another example, more than two frequency bands may be used. These embodiments are not limiting, however, as the FEM circuitry 500 may be configured to operate in one frequency band, in some cases.

It should be noted that the example FEM circuitry 500 may illustrate some or all of the concepts and/or techniques described herein, although embodiments are not limited by the example FEM circuitry 500 shown in FIG. 5. In addition, embodiments are not limited to the number of components and/or arrangement of components as shown in FIG. 5. The FEM circuitry 500 may receive, as input, the RF output signal 215 (FIG. 2) or one or more related signals. As an example, multiple RF output signals 215 may be used, such as RF output signals 215 associated with different baseband signals and/or data streams. As another example, multiple copies of the RF output signal 215 may be used.

In some embodiments, a packet of information bits may be encoded using any number of transmit functions such as forward error correction (FEC), interleaving, bit-to-symbol mapping, modulator and/or other functions as part of the generation of the baseband signals. These embodiments are not limiting, however, as other suitable baseband signals may be used in some cases, including baseband signals that may be generated using other techniques. The baseband signals may be converted to RF signals using up-conversion mixers, filters and/or other functions. As a non-limiting example, the baseband processing circuitry 300 (FIG. 3) and/or the radio IC circuitry 200 (FIG. 2) may be used.

As part of a transmit path, the RF output signal(s) 215 may be input to one or more tunable amplitude shifters 505 and/or one or more tunable phase shifters 510. The output(s) 520 of these blocks may be input to the hybrid coupler 530 which may generate one or more antenna transmit signals 540 for transmission on one or more antennas 101 (FIG. 1) to which the hybrid coupler 530 may be coupled. In addition, one or more antenna receive signals 550 from the antennas 101 may be input to the hybrid coupler 530 as part of a receive path. The hybrid coupler may generate or produce one or more output signals 560 for the receive path. The output signals 560 may be input to the radio IC circuitry 106 as the RF input signal 201 (FIG. 2), in some cases.

As will be described below, the amplitude shifters 505 and/or the phase shifters 510 may be tuned to appropriate values and/or settings to generate various configurations for the FEM circuitry 500. As an example, a transmit signal may be routed to one of two transmit antennas by tuning of the amplitude shifters 505 and/or phase shifters 510. As another example, the amplitude shifters 505 and/or phase shifters 510 may be tuned to route multiple transmit signals to two different antennas in an orthogonal configuration. Accordingly, an uplink multiple-input multiple-output (MIMO) transmission may be enabled. These and other examples will be presented in more detail below.

In some embodiments, a component such as a phase-locked loop (PLL) may be coupled to the phase shifters 510 for phase-shining of signals. The HI or other component may or may not be included in the FEM circuitry 500. In addition, embodiments are not limited to arrangements with a dedicated PLL or other component for this purpose. For instance, a PLL that provides other functionality for the radio architecture system 100 may provide phase-shifting functionality for the phase shifters 510 in addition to the other functionality. In some embodiments, a time to digital converter (TDC) may be coupled to the phase shifters 510 for the phase-shifting of signals.

It should be noted that in some embodiments, all of the phase shifters and/or amplitude shifters described herein may not necessarily be included in some implementations. As an example, various phase differences between a first and a second FEM signal may be generated by adjusting the phase shift applied to the second FEM signal. Therefore, in some implementations, a phase shifter for the first FEM signal may be excluded and a phase shifter for the second FEM signal may be included. As another example, various amplitude differences between the first and the second FEM signal may be generated by adjusting the amplitude shift applied to the second FEM signal. Therefore, in some implementations, an amplitude shifter for the first FEM signal may be excluded and an amplitude shifter for the second FEM signal may be included. These examples are not limiting, however, as other suitable implementations of these and other scenarios may be used.

Returning to the method 400, at operation 415, one or more hybrid coupler output signals may be generated for transmission on one or more antennas. In some embodiments, the hybrid coupler 530 may perform routing and/or switching functionality for the FEM circuitry 500. As an example, the hybrid coupler 530 may form various summations of two input signals according to a predetermined phase shift, such as 90 degrees or other, to produce one or more output signals. For instance, a summation of a first input signal with a phase-shifted version of a second input signal, with the phase-shifting performed by the hybrid coupler 530, may be generated as a first output signal. A summation of the second input signal with a phase-shifted version of the first input signal, with the phase-shifting performed by the hybrid coupler 530, may also be generated as a second output signal. In some cases, the first and second output signals (or signals based on them) may be used as first and second antenna transmit signals 540. As a non-limiting example, the summations may use the same phase shift, such as positive 90 degrees or negative 90 degrees or other value.

It should be noted that embodiments are not limited to usage of positive 90 degree phase shifts and/or negative 90 degree phase shifts for the hybrid coupler. As an example, the hybrid coupler 530 may be configured to perform summations (such as those described previously) according to a phase shift of 180 degrees or other suitable value in some embodiments. In such embodiments, various phase-shift settings and/or amplitude-shift settings may be used to enable UL-MIMO, UL-CA, UL transmit diversity and/or other configurations described herein. The settings may depend at least partly on the particular phase shift of the hybrid coupler, in some cases. For instance, a first set of phase-shift settings and/or amplitude-shift settings may be used for a 90 degree phase shift of the hybrid coupler to enable the UL-MIMO, UL-CA, UL transmit diversity and/or other configurations. A second set of phase-shift settings and/or amplitude-shift settings may be used for a 180 degree phase shift of the hybrid coupler to enable those configurations (or similar configurations), and some or all of the settings in the first and second sets may be the same or may be different.

It should be pointed out that phase-shifting operations that are performed by the hybrid coupler, the phase shifters or other component may be described herein in terms of a phase shift value (such as 90 degrees or other). In addition, resulting phase shifts on output signals or other signals may also be described herein in terms of a phase shift value. However, it is understood that such phase shift values may not necessarily be exact values. As an example, a particular phase shift value may be desired, and an operation may produce a phase shift that is "substantially" of that particular phase shift value. As another example, an operation may be performed "according to a particular phase shift value" with an intention that the particular phase shift value be used in the operation or that the particular phase shift value is a result of the operation. For instance, in practice, an operation in which a 90 degree phase shift is intended may produce a phase shift that is near 90 degrees, within a certain percentage of 90 degrees or substantially 90 degrees. Such discrepancies may result from impairments and/or other aspects of physical components that may be used. Accordingly, embodiments are not limited to exact phase shift values. Similarly, amplitude-shifting operations, amplitudes of signals, resulting amplitudes and/or other amplitudes may be described herein in terms of particular amplitude values, but it is understood that embodiments are not limited to exact amplitude shift values or exact amplitude values. As an example, amplitude-shifting operations may be performed "according to a particular amplitude shift value" in some cases. As another example, a particular amplitude shift value may be desired, and an operation may produce an amplitude shift that is near to, within a particular percentage of, or "substantially" of that particular amplitude shift value.

In some embodiments, the hybrid coupler may include a primary transmission line coupled directly to a first input and to a first output. The hybrid coupler may further include a secondary transmission line coupled directly to a second input and to a second output. The primary and secondary transmission lines may be coupled, for instance in close physical proximity. In some cases, when a signal is carried over the primary transmission line, a component of that signal may also appear on the secondary line as a result of the physical arrangement of the two transmission lines. Accordingly, the previously described input/output relationships and/or functionality of the hybrid coupler may be realized. In some embodiments, additional components may also be included in the hybrid coupler.

Figure 6:
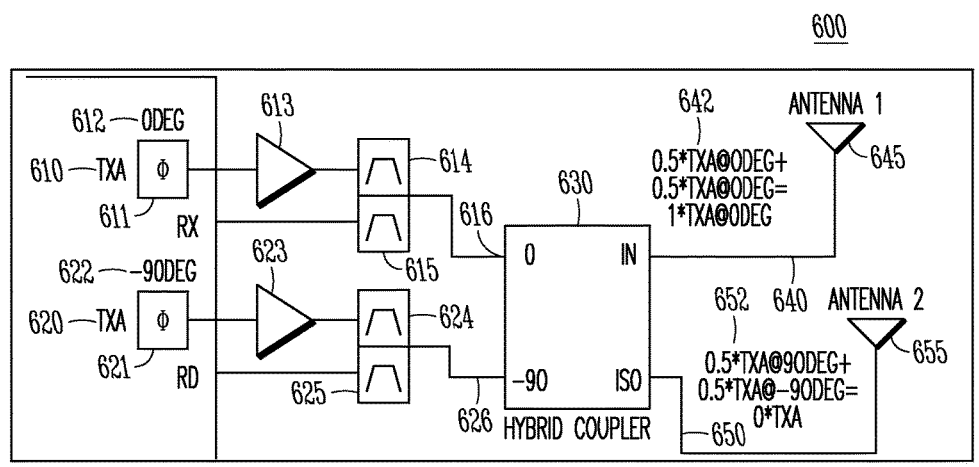
FIG. 6 illustrates an example of FEM circuitry for routing of a transmit signal to one antenna in accordance with some embodiments.
Figure 7:
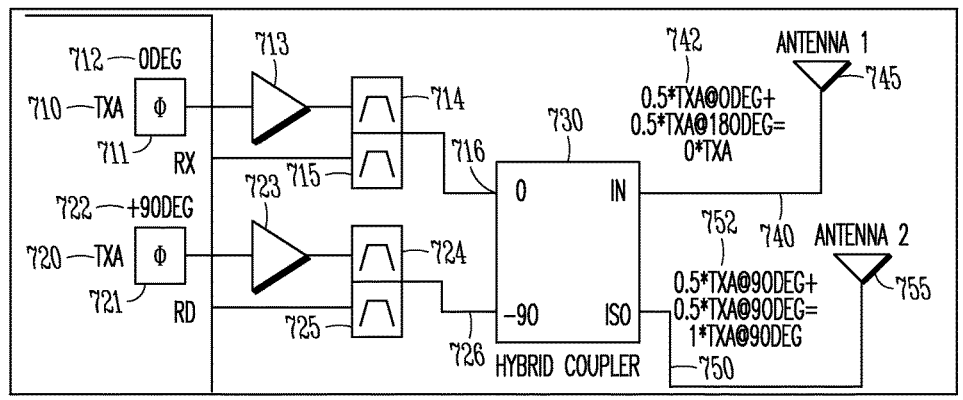
FIG. 7 illustrates another example of FEM circuitry for routing of a transmit signal to one antenna in accordance with some embodiments.
Figure 8:
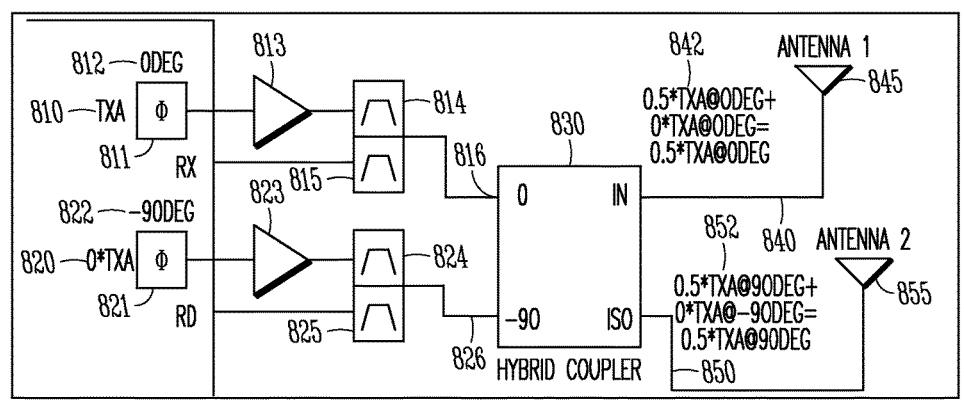
FIG. 8 illustrates an example of FEM circuitry for splitting a transmit signal between antennas in accordance with some embodiments.
Figure 9:
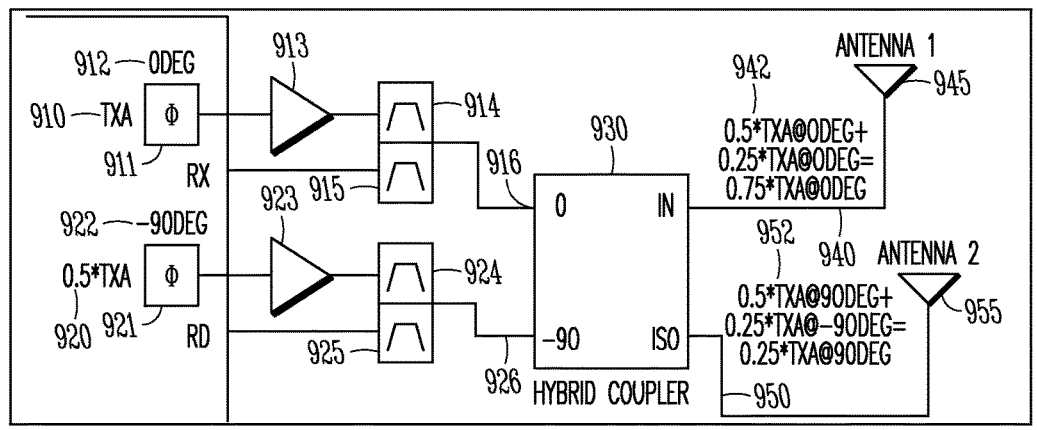
FIG. 9 illustrates another example of FEM circuitry for splitting a transmit signal between antennas in accordance with some embodiments.
Figure 10:
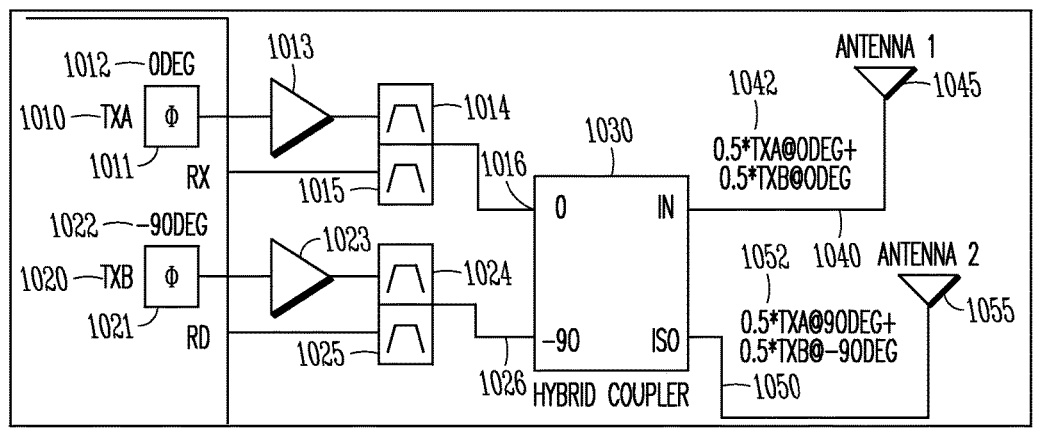
FIG. 10 illustrates an example of FEM circuitry for uplink multiple-input multiple-output (MIMO) transmission in accordance with some embodiments.

Several non-limiting examples of FEM circuitry will be presented below. FIG. 6 illustrates an example of FEM circuitry for routing of a transmit signal to one antenna in accordance with some embodiments. FIG. 7 illustrates another example of FEM circuitry for routing of a transmit signal to one antenna in accordance with some embodiments. FIG. 8 illustrates an example of FEM circuitry for splitting a transmit signal between antennas in accordance with some embodiments. FIG. 9 illustrates another example of FEM circuitry for splitting a transmit signal between antennas in accordance with some embodiments. FIG. 10 illustrates an example of FEM circuitry for uplink multiple-input multiple-output (MIMO) transmission in accordance with some embodiments.

The examples in FIGS. 6-10 may illustrate some or all of the concepts and/or techniques described herein, in some cases, although embodiments are not limited by the examples shown. It should be noted that embodiments are not limited to the arrangement of the elements and/or the number of elements as shown in the examples in FIGS. 6-10. In addition, some embodiments may include one or more elements shown in one or more of the examples in FIGS. 6-10, and some of those embodiments may include additional elements.

In some of these examples, various functionalities such as uplink MIMO transmission, diversity transmission, routing and/or switching between transmit antennas may be realized. In some embodiments, a combination of a hybrid coupler, tunable phase shifters, and tunable amplitude shifters (and perhaps other components) may be used instead of a crossbar switch or other switch to perform these and other functionalities on the radio architecture system 100. Such embodiments are not limited to the examples in FIGS. 6-10.

Referring to FIG. 6, the example FEM circuitry 600 may be used to route an input FEM signal 610, 620 to the first antenna 645. In this case, the same signal may be used as the FEM input signal 610, 620, which are both labeled as "TXA" accordingly. The FEM input signals 610, 620 may include or may be based on a radio frequency (RF) signal that is based on a baseband signal received from radio IC circuitry 106. As an example, the baseband signal may be based on one or more packets of information bits. As previously described, phase-shift values such as negative 90, 0, positive 90, 180 or otherwise that are described for this example and for other examples may not necessarily be exact and may be near those values or within a percentage of those values in some cases.

As shown in FIG. 6, the FEM input signal 610 may be input to the tunable phase shifter 611, which may be tuned to a phase shift of "0" degrees as indicated by 612. A power amplifier (PA) 613 and filter 614 may be used to produce a first hybrid coupler input signal 616 for input to the hybrid coupler 630. The FEM input signal 620 may be input to the tunable phase shifter 621, which may be tuned to a phase shift of negative 90 degrees as indicated by 622. The PA 623 and filter 624 may be used to produce a second hybrid coupler input signal 626 for input to the hybrid coupler 630.

The hybrid coupler may generate a first output signal 640 to be transmitted on the first antenna 645 and may generate a second output signal 650 to be transmitted on the second antenna 655. As previously described, the output signals 640, 650 may be based on the input signals 616, 626 and may be further based on a predetermined hybrid coupler phase shift. As shown in FIG. 6, the input port for the second hybrid coupler input signal 626 is labeled as "−90" to indicate a 90 degree phase shift for the hybrid coupler phase shift.

As shown by the equation 642, the first input signal 616 may be summed with the second input signal 626 phase-shifted by the 90 degree hybrid coupler phase shift to generate the first output signal 640. It should be noted that the terms that are summed in equation 642 (and 652 in this example) include multipliers of 0.5 in this case, which may result from inherent operation of the hybrid coupler 630 in some embodiments. That is, the multipliers of 0.5 may represent that the power of the input signals at the input ports 616, 626 may be split equally (in terms of power) to the output ports 640, 650. These embodiments are not limiting, however, as other configurations of the hybrid coupler 630 may operate according to different multipliers in some embodiments. It should be recalled that the FEM input signal 620 is phase-shifted by the phase shifter 621 by negative 90 degrees (as indicated by 622). Therefore the summation 642, may include the FEM input signal 610 summed with the FEM input signal 620 aligned in phase with zero phase shift (as the negative 90 degree phase shift in 621 and the positive 90 degree phase shift in 630 cancel). As the FEM input signals 610, 620 are based on the same signal in this case, the first output signal 640 may therefore be, or may be near, the FEM input signal 610, or "TXA" as shown.

Continuing with the example of FIG. 6, as shown by the equation 652, the second input signal 626 may be summed with the first input signal 616 phase-shifted by the 90 degree hybrid coupler phase shift to generate the second output signal 650. Therefore the summation may include the FEM input signal 610 phase-shifted by 90 degrees summed with the FEM input signal 620 phase-shifted by negative 90 degrees. As the FEM input signals 610, 620 are based on the same signal in this case, the second output signal 650 may be, or may be near, zero as shown in FIG. 6. That is, the two terms described above that are included in the summation may be the same term phase-shifted by 180 degrees, which means that their sum may be zero or near zero. Effectively, the second antenna 655 may not transmit signal TXA since the signal level at the antenna is "0".

Accordingly, the tuning of the second tunable phase shifter 621 to the value of negative 90 degrees and the tuning of the first tunable phase shifter 611 to the value of zero degrees may route the signal TXA to the first antenna 645. As previously noted, the second output signal 650 may not be exactly zero degrees due to inexactness of the phase shift values or other factors. Accordingly, the second antenna 655 may receive a non-zero signal component from the signal TXA, although such a component may be small or near zero.

As shown in this example, when the first and second phase shifters 611, 621 operate on the FEM input signals 610, 620 (which are both TXA or based on TXA) such that a phase of the first hybrid coupler input signal 616 is 90 degrees ahead of a phase of the second hybrid coupler input signal 626, a signal component of the FEM input signal may be included in the first output signal 640 (or first antenna transmit signal 640) and may be restricted and/or excluded from the second output signal 650 (or second antenna transmit signal 650). As a non-limiting example, the component of the TXA included in the second antenna transmit signal 650 may be at least 20 decibels (dB) below the component of the TXA included in the first antenna transmit signal 640 in terms of average power or other power measurement. The value of 20 dB is not limiting, as other values such as 10 dB, 30 dB or other value may be used to determine whether or not a signal is routed to, restricted from or excluded from an antenna.

Referring to FIG. 7, the example FEM circuitry 700 may be used to route an input FEM signal 710, 720 to the second antenna 755 using the tunable phase shifters 711, 721 and the hybrid coupler 730, which may be similar to components used in the example shown in FIG. 6. As in the example shown in FIG. 5, the same signal may be used as the FEM input signal 710, 720 (both labeled as "TXA" accordingly) and the FEM input signals 710, 720 may be similar to those used in the example shown in FIG. 6. In this example of FIG. 7, the first phase shifter 711 may be set to a value of zero degrees and the second tunable phase shifter may be tuned to a value 722 of positive 90 degrees (as opposed to the value 622 of negative 90 degrees used in the example shown in FIG. 6). As indicated by equations 742 and 752 for the first and second output signals 740, 750, the signal TXA may be routed to the second antenna such that a signal component of the signal TXA is included in the second output signal 750 and excluded from or restricted from the first output signal 740.

As shown in this example, when the first and second phase shifters 711, 721 operate on the FEM input signals 710, 720 (which are both TXA or based on TXA) such that a phase of the first hybrid coupler input signal 716 is 90 degrees behind a phase of the second hybrid coupler input signal 726, a signal component of the FEM input signal may be included in the second output signal 750 (or second antenna transmit signal 750) and may be restricted from and/or excluded from the first output signal 740 (or first antenna transmit signal 740).

Accordingly, when the same signal (TXA) is used as the first and second FEM input signals, the signal TXA may be routed to the first or second antenna by setting the first phase shifter to a value of zero degrees and by setting the second phase shifter to a value of substantially negative 90 degrees or substantially positive 90 degrees, respectively. That is, a best antenna selection (BAS) configuration may be enabled, in which either the first or second antenna is selected for transmission of the signal TXA by appropriate tuning of the phase shifters.

It should be noted that in some embodiments, the phase shifters and/or amplitude shifters may be tuned to cancel and/or remove a signal component from a particular antenna transmit signal. For instance, in the examples shown in FIGS. 6-7, the signal component may be canceled from and/or removed from the first antenna transmit signal 650 or second antenna transmit signal 650.

In some embodiments, the phase shifters and/or amplitude shifters may be configured to adjust phases and/or amplitudes of one or more FEM input signals based at least partly on feedback related to the antenna transmit signals. In some cases, the FEM circuitry may be configured to provide feedback to the phase shifters and/or amplitude shifters that may comprise phase differences, difference signals, error signals or other signals. The FEM circuitry may comprise additional components (such as phase comparators or others) to generate such feedback in some cases. Although embodiments are not limited as such, the adjustments may be performed in discrete steps in some cases. As an example, phase adjustments by a number of degrees or fractions of degrees may be used.

As a non-limiting example, the first and second antenna transmit signals may comprise first and second signal components of the FEM input signal, phase-shifted by substantially 180 degrees. As described herein, the phase shift of 180 degrees may not be exact for reasons such as impairments or imperfections in physical components or other. For instance, imperfections in the hybrid coupler and/or other components may cause the phase shift to be different than 180 degrees in this example. As another non-limiting example, the first and second signal components of the FEM input signal may be phase-shifted by substantially 90 degrees or other value, which may not necessarily be exact. In these and other cases, the FEM circuitry may be configured to provide feedback based on phase differences or other signals that may enable the phase shifters and/or amplitude shifters to compensate and/or correct these and other imperfections and/or impairments through tuning.

Referring to FIG. 8, the example FEM circuitry 800 may be used to split a signal (labeled "TXA") between the two antennas 845, 855. The input FEM signal 810, 820 is based on the same signal TXA, which may be similar to the signals used in previous examples shown in FIGS. 6-7. In this case, the signal 820 may be disabled and/or turned off, which may be performed in any suitable manner. As an example, components in the transmit path for the signal 820, such as the phase shifter 821 and/or PA 823 may be disabled and/or turned off. As another example, a tunable amplitude shifter may disable and/or turn off the signal 820. As another example, the tunable amplitude shifter may be tuned to apply an amplitude-shift value of zero to the signal TXA (as indicated by the label "0*TXA" in FIG. 8) to disable and/or turn off the signal 820. As shown by the equation 842, the first output signal 840 may therefore be, or may be near, the signal TXA phase-shifted by zero degrees (and scaled or multiplied by 0.5) as shown. In addition, as shown by the equation 852, the second output signal 850 may therefore be, or may be near, the signal TXA phase-shifted by 90 degrees (and scaled or multiplied by 0.5) as shown. That is, the antenna transmit signals 840, 850 may both include signal components of the signal TXA separated in phase (or phase-shifted with respect to each other) by 90 degrees. It should be noted that in this case, the signal components are of the same magnitude, or nearly the same magnitude, of 0.5.

Referring to FIG. 9, the example FEM circuitry 900 may be used to split the signal (labeled "TXA") unequally between the two antennas 945, 955. The input FEM signal 910, 920 may be based on the same signal TXA as in the previous example shown in FIG. 8. In this case, an amplitude shifter is used to apply a multiplier (or amplitude shift) of 0.5 to the signal 920 while the phase shifter 921 is set to apply a phase shift of negative 90 degrees as indicated by 922. The phase shifter 911 for the first input FEM signal 910 is set to a value of zero, and an amplitude shifter may also apply a multiplier of 1.0 to the signal 910. It should be noted that scaling values of 0.5, 1.0 or otherwise may be relative to one another in some cases. For instance, the same or similar results may be realized with values of A and 0.5 A as multipliers for the signals 910 and 920, respectively.

As shown by the equation 942, the first output signal 940 may therefore be, or may be near, the signal TXA phase-shifted by zero degrees (and scaled or multiplied by 0.75) as shown. In addition, as shown by the equation 952, the second output signal 950 may therefore be, or may be near, the signal TXA phase-shifted by 90 degrees (and scaled or multiplied by 0.25) as shown. That is, the antenna transmit signals 940, 950 may both include signal components of the signal TXA separated in phase (or phase-shifted with respect to each other) by 90 degrees and scaled unequally (0.75 and 0.25).

As shown by the examples in FIGS. 8-9, a split transmit diversity configuration may be enabled, in which the first antenna transmit signal may comprise a first signal component of the first RF signal and the second antenna transmit signal may comprise a second signal component of the first RF signal. When one of the input FEM signals, such as the second signal 820, is disabled and/or turned off, the signal components on the antennas may be of equal or similar magnitude. When the amplitude shifters apply a non-zero amplitude value to one of the input FEM signals (such as the second signal 920), the signal components on the antennas may be of unequal magnitude.

It should be noted that UL-CA may also be used, such as in the examples shown in FIGS. 8-9, when the first and second antennas are configured to transmit in different channel resources, such as in different frequency channels or different frequency bands. For instance, the split transmit diversity configuration may also enable the UL-CA when the antennas are configured to transmit the diversity signals in different channels and/or bands.

Referring to FIG. 10, the example FEM circuitry 1000 may be used to enable UL-MIMO and/or UL-CA configurations. In this case, a first FEM input signal 1010 (labeled as "TXA") and a second FEM input signal 1020 (labeled as TXB") may be used. In some embodiments, the first and second FEM input signals may be based on first and second RF signals that may be based on first and second baseband signals. Accordingly, the signals 1010 and 1020 may be based on different data streams in some cases.

As shown in FIG. 10, the first FEM input signal 1010 may be input to the tunable phase shifter 1011, which may be tuned to a phase shift of "0" as indicated by 1012 while the second FEM input signal 1020 may be input to the tunable phase shifter 1021, which may be tuned to a phase shift of negative 90 degrees as indicated by 1022. In this case, amplitude-shift values for the two signals 1010 and 1020 may be the same, although embodiments are not limited as such. The hybrid coupler 1030 may generate a first output signal 1040 to be transmitted on the first antenna 1045 and may generate a second output signal 1050 to be transmitted on the second antenna 1055. As previously described, the output signals 1040, 1050 may be based on the input signals 1016, 1026 and may be further based on a predetermined hybrid coupler phase shift.

As shown by the equation 1042, the first output signal 1040 may comprise signal components of both TXA and TXB. In this case, those components may be equally weighted and may have a phase shift of substantially zero. The second output signal 1050 may also comprise signal components of both TXA and TXB according to a configuration that is orthogonal to the signal 1040. That is, the second output signal 1050 may comprise a component of TXA that is 90 degrees ahead of the component of TXA comprised by the first output signal 1040. In addition, the second output signal 1050 may comprise a component of TXB that is 90 degrees behind the component of TXB comprised by the first output signal 1040.

Accordingly, a UL-MIMO configuration may be enabled when the first and second antennas are configured to transmit in common channel resources or in the same frequency channel. In addition, a UL-CA configuration may be enabled when the first and second antennas are configured to transmit in different channel resources, such as in different frequency channels or different frequency bands.

As an example, a base station or other component receiving these signals transmitted from the antennas may use the orthogonality of the two transmitted signals to separate the TXA and TXB signal components using two phase-shifted summations. The TXB component may be determined by summing the first output signal 1040 with the second output signal 1050 phase-shifted by positive 90 degrees. The TXA component may be determined by summing the first output signal 1040 with the second output signal 1050 phase-shifted by negative 90 degrees.

Returning to the method 400, at operation 420, one or more hybrid coupler receive output signals may be generated, and may be based on one or more antenna receive signals. It should be noted that some or all of the embodiments and/or examples described herein may be applicable to Frequency Division Duplex (FDD) systems, Time Division Duplex (TDD) systems or others. For instance, although duplexers or other components that may be used in FDD systems may be described in some examples, embodiments are not limited to FDD.

In some embodiments, the input and output ports of the hybrid coupler that are used as part of transmission operations may also be used for the received signals from the antenna. The hybrid coupler may be a reciprocal and bilateral network enabling signal propagation in either direction. For instance, the input/output arrangement of the ports as used for transmission may be reversed for the reception. That is, output ports used for sending of the antenna transmit signals to the antennas for transmission may receive the antenna receive signals as input. In addition, the input ports used for receiving RF signals at the hybrid coupler as part of the transmission may also output one or more hybrid coupler receive output signals to be passed to the baseband circuitry for processing.

Figure 11:
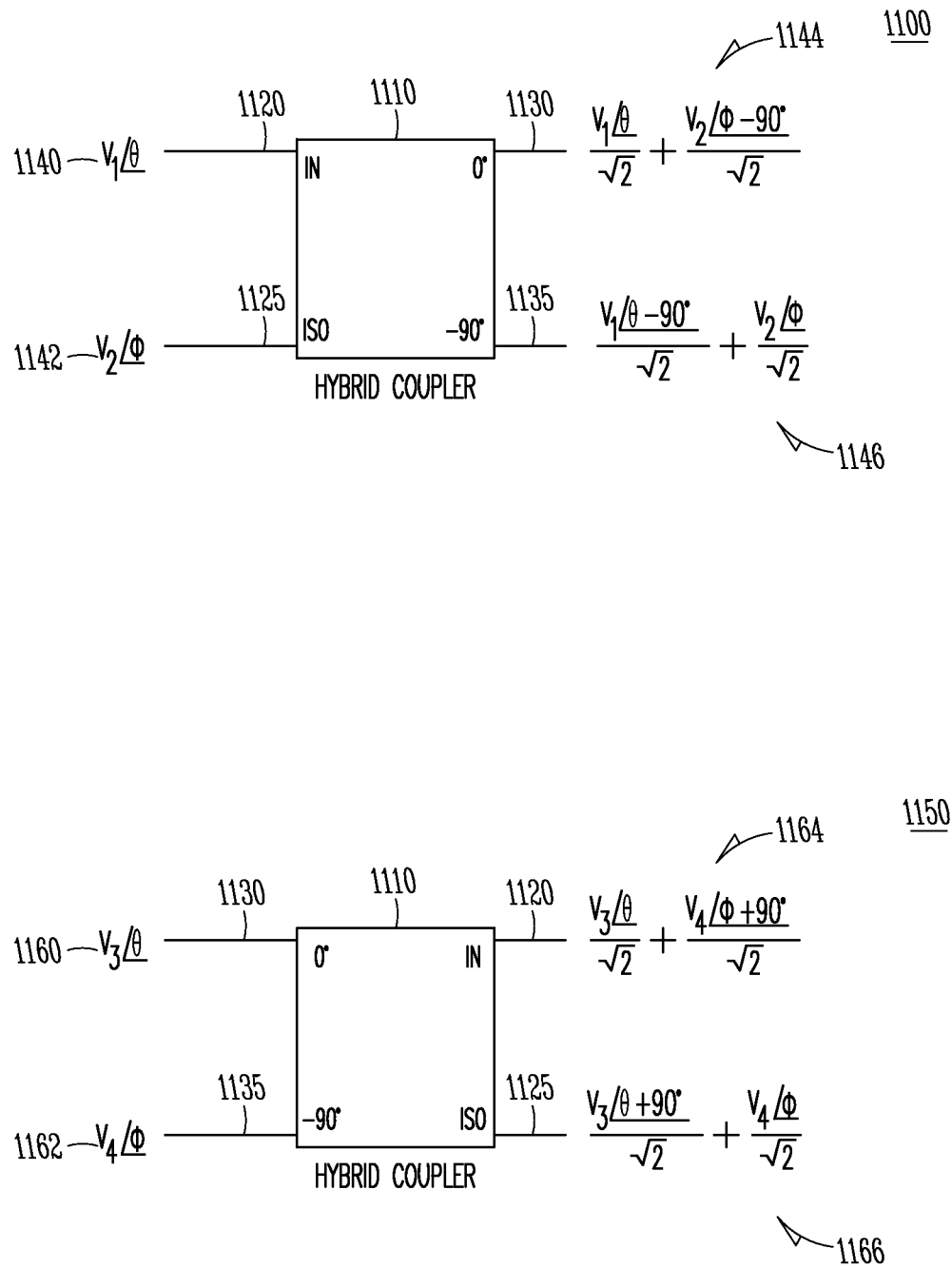
FIG. 11 illustrates an example of a hybrid coupler in accordance with some embodiments.

FIG. 11 illustrates an example of a hybrid coupler in accordance with some embodiments. The example hybrid coupler 1110 shown in FIG. 11 may serve to illustrate some or all of the techniques, operations, and concepts described herein, but embodiments are not limited by the example shown in FIG. 11. The arrangement of input ports, output ports, summations, and other aspects of the example hybrid coupler 1110 are also not limiting. It should be noted that the example scenarios 1100, 1150 are shown in a voltage domain, and therefore the input and output signals are shown as phasors with a voltage and an angle. The example hybrid coupler 1110 may include two sets of ports, which may be used as input ports and/or output ports due to the bilateral operation previously described.

As shown by the example scenario 1100, signals 1140 and 1142 may be input to the ports 1120 and 1125 (labeled IN and ISO). In this example, the input signals 1140 and 1142 are shown with different voltage levels V1 and V2 and with different phases ($\theta$ and $\varnothing$), but embodiments are not limited as such. For instance, output signals from the phase shifters and/or amplitude shifters as described herein may or may not have different phases and/or amplitudes, and may be used as hybrid coupler input signals.

Output signals 1144 and 1146 may be generated, by the hybrid coupler 1110, at the ports 1130 and 1135 (labeled "0" and "−90"). The output 1144 may comprise a summation of the first term 1140 (without a phase shift) and the second term 1142 phase-shifted by negative 90 degrees. The output 1146 may comprise a summation of the second term 1142 (without a phase shift) and the first term 1140 phase-shifted by negative 90 degrees. In addition, the weighting by 1/sqrt(2) may also be included.

Figure 12:
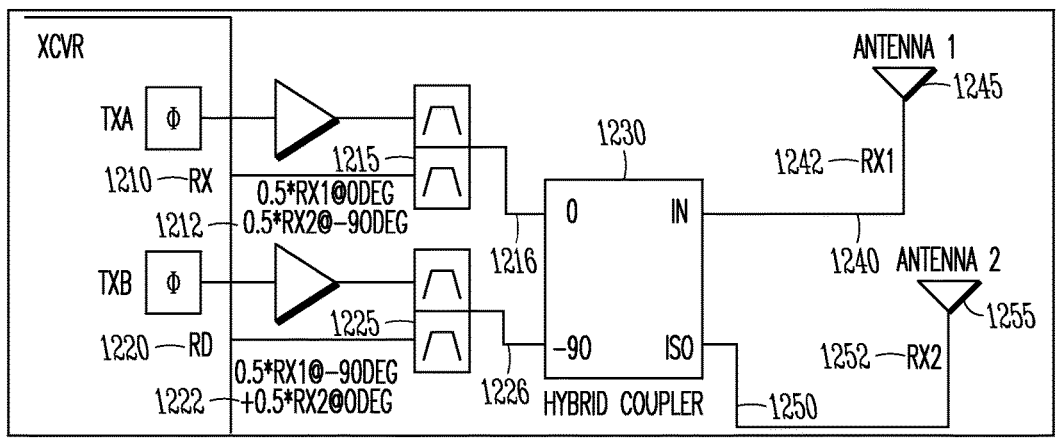
FIG. 12 illustrates an example of FEM circuitry for downlink reception in accordance with some embodiments.
Figure 13:
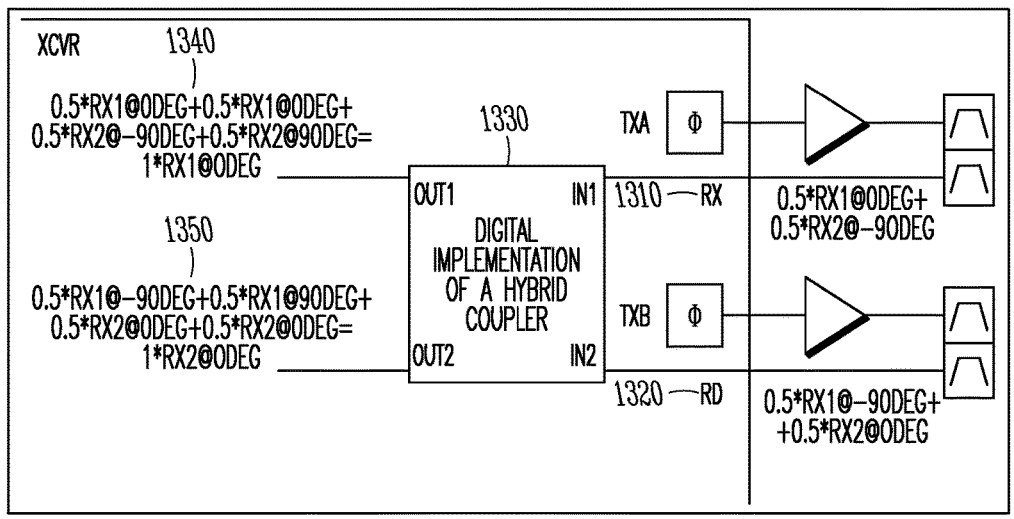
FIG. 13 illustrates another example of FEM circuitry for downlink reception in accordance with some embodiments.

As shown by the example scenario 1150, signals 1160 and 1162 may be input to the ports 1130 and 1135, and the hybrid coupler 1110 may generate output signals 1164 and 1166 at the ports 1120 and 1125. Accordingly, the scenarios 1100 and 1150 may illustrate the bilateral operation of the hybrid coupler 1110. In this case, the output 1164 may comprise a summation of the first term 1160 (without a phase shift) and the second term 1162 phase-shifted by positive 90 degrees. The output 1166 may comprise a summation of the second term 1162 (without a phase shift) and the first term 1160 phase-shifted by positive 90 degrees. In addition, the weighting by 1/sqrt(2) may also be included FIG. 12 illustrates an example of FEM circuitry for downlink reception in accordance with some embodiments. FIG. 13 illustrates another example of FEM circuitry for downlink reception in accordance with some embodiments. The examples in FIGS. 12-13 may illustrate some or all of the concepts and/or techniques described herein, in some cases, although embodiments are not limited by the examples shown. It should be noted that embodiments are not limited to the arrangement of the elements and/or the number of elements as shown in the examples in FIGS. 12-13. In addition, some embodiments may include one or more elements shown in one or more of the examples in FIGS. 12-13, and some of those embodiments may include additional elements.

Referring to FIG. 12, receive antenna signals RX1 and RX2 (indicated by 1242 and 1252) may be received at antennas 1245 and 1255, and passed to the hybrid coupler 1230. As previously described, the hybrid coupler may perform summations according to a predetermined hybrid coupler phase shift, which may be 90 degrees in some embodiments. The signals 1216 and 1226 may include "output" signals with respect to the receive operation shown in FIG. 12, in contrast to the transmit operations previously described in which those signals may be considered as "input" signals to the hybrid coupler 1230. The signals 1216 and 1226 may be passed through the filters 1215 and 1225 to produce signals 1210 and 1220, which may be passed to the baseband circuitry for further processing. It should be noted that, as described by equations 1212 and 1222, the signals 1210 and 1220 both depend on both received signals RX1 and RX2.

Accordingly, further processing may be used to "decouple" signal components of RX1 and RX2 from the two signals 1210 and 1220. As shown in FIG. 13, a digital hybrid coupler 1330 may be used to perform summations which may include 90 degree phase shifts. It should be noted that some or all portions of the digital hybrid coupler 1330 may be implemented using software, hardware and/or firmware techniques, in some embodiments.

At operation 425, one or more packets of information bits may be determined based on the hybrid coupler receive output signals. Referring back to the example of FIG. 13, as shown in equation 1340, the signal 1310 (or the same signal as 1210 from FIG. 12) may be summed with the signal 1320 (or the same signal as 1220 from FIG. 12) phase-shifted by 90 degrees to generate a signal component of RX1. In addition, as shown in equation 1350, the signal 1320 may be summed with the signal 1310 phase-shifted by 90 degrees to generate a signal component of RX2. These may be further processed by the baseband circuitry. For instance, one or more packets of information bits may be decoded based on the signal components of 1340 and 1350.

An example of Front end module (FEM) circuitry is disclosed herein. The FEM circuitry may comprise a hybrid coupler to generate a first antenna transmit signal and a second antenna transmit signal. The FEM circuitry may further comprise one or more tunable phase shifters to generate hybrid coupler input signals based at least partly on an FEM input signal. The first antenna transmit signal may be based on a first summation that comprises a first hybrid coupler input signal and further comprises a second hybrid coupler input signal phase-shifted, by the hybrid coupler, according to a predetermined hybrid coupler phase shift. The second antenna transmit signal may be based on a second summation that comprises the second hybrid coupler input signal and further comprises the first hybrid coupler input signal phase-shifted, by the hybrid coupler, according to the hybrid coupler phase shift.

In some examples, the tunable phase shifters may be coupled to a phase-locked loop (PLL) for phase-shifting of the FEM input signal for generation of the hybrid coupler input signals. In some examples, the FEM input signal may comprise a radio frequency (RF) signal that is based on a baseband signal. In some examples, the predetermined hybrid coupler phase shift may be substantially 90 degrees. In some examples, when the tunable phase shifters phase-shift the FEM input signal to generate a phase difference of positive 90 degrees for the first hybrid coupler input signal with respect to the second hybrid coupler input signal, a signal component of the FEM input signal may be included in the first antenna transmit signal and may be restricted from the second antenna transmit signal. In some examples, when the tunable phase shifters phase-shift the FEM input signal to generate a phase difference of negative 90 degrees for the first hybrid coupler input signal with respect to the second hybrid coupler input signal, the signal component of the FEM input signal may be included in the second antenna transmit signal and may be restricted from the first antenna transmit signal.

In some examples, when the tunable phase shifters phase-shift the FEM input signal to generate a phase difference of positive 90 degrees for the first hybrid coupler input signal with respect to the second hybrid coupler input signal, the first antenna transmit signal may comprise a first signal component of the FEM input signal that is at least 20 decibels (dB) higher than a second signal component of the FEM input signal that is included in the second antenna transmit signal. In some examples, the tunable phase shifters may be configured to phase-shift the FEM input signal based at least partly on feedback that comprises a phase difference between signal components of the first antenna transmit signal and the second antenna transmit signal. In some examples, the FEM circuitry may further comprise one or more tunable amplitude shifters to adjust an amplitude of the FEM input signals to generate the hybrid coupler input signals. When the tunable amplitude shifters disable the second hybrid coupler input signal, the first antenna transmit signal may comprise a first signal component of the FEM input signal and the second antenna transmit signal may comprise a second signal component of the FEM input signal. The second signal component may be based on the first signal component phase-shifted by a phase shift of substantially 90 degrees. In some examples, the disablement of the second hybrid coupler input signal may comprise an amplitude-shifting of the FEM input signal to generate an amplitude of zero for the second hybrid coupler input signal. In some examples, the hybrid coupler input signals generated by the tunable phase shifters may be further based on a second FEM input signal. The FEM input signal may comprise a first radio frequency (RF) signal that is based on a first baseband signal and the second FEM input signal may comprise a second RF signal that is based on a second baseband signal. In some examples, when the tunable phase shifters phase-shift the first FEM input signal by a first phase shift and phase-shift the second FEM input signal by a second phase shift that is 90 degrees behind the first phase shift, components of the first FEM input signal included in the first and second transmit antenna signals may be phase-shifted according to a phase shift of positive 90 degrees with respect to each other. Components of the second FEM input signal included in the first and second transmit antenna signals may be phase-shifted according to a phase shift of negative 90 degrees with respect to each other.

An example apparatus for User Equipment (UE) is disclosed herein. The apparatus may comprise one or more tunable phase shifters to generate first and second hybrid coupler input signals, a hybrid coupler to generate first and second antenna transmit signals, and first and second antennas to transmit the antenna transmit signals. When the phase shifters phase-shift a first radio frequency (RF) signal and a second RF signal according to a 90 degree phase difference to generate the hybrid coupler input signals, and when the first RF signal is based on a first baseband signal and the second RF signal is based on a second baseband signal, the antenna transmit signals may be transmitted according to an uplink (UL) multiple-input multiple-output (UL-MIMO) configuration when the first and second antenna signals are configured to transmit in common channel resources. In some examples, the first antenna transmit signal may be based on a first summation that may comprise the first hybrid coupler input signal and may further comprise the second hybrid coupler input signal phase-shifted, by the hybrid coupler, according to a predetermined hybrid coupler phase shift. The second antenna transmit signal may be based on a second summation that may comprise the second hybrid coupler input signal and may further comprise the first hybrid coupler input signal phase-shifted, by the hybrid coupler, according to the hybrid coupler phase shift. The predetermined hybrid coupler phase shift may be substantially 90 degrees.

In some examples, when the antenna transmit signals are transmitted according to the UL-MIMO configuration, the first antenna transmit signal may comprise a first signal component of the first RF signal and may further comprise a second signal component of the second RF signal. The second antenna transmit signal may comprise the first signal component of the first RF signal phase-shifted substantially by positive 90 degrees and may further comprise the second signal component of the second RF signal phase-shifted substantially by negative 90 degrees. In some examples, when the phase shifters phase-shift the first RF signal and the second RF signal according to the 90 degree phase difference to generate the hybrid coupler input signals, the antenna transmit signals may be transmitted according to a UL carrier aggregation (UL-CA) configuration when the first and second antennas are configured to transmit in non-overlapping channel resources.

In some examples, when the phase shifters phase-shift the first RF signal according to a first phase shift to generate the first hybrid coupler input signal and further phase-shift the first RF signal according to a second phase shift and when the second phase shift is substantially 90 degrees behind the first phase shift, the antenna transmit signals may be transmitted according to a UL best antenna selection (BAS) configuration in which the first antenna is selected for transmission. When the second phase shift is substantially 90 degrees ahead of the first phase shift, the antenna transmit signals may be transmitted according to the UL BAS configuration in which the second antenna is selected for transmission.

In some examples, the apparatus may further comprise one or more amplitude shifters to generate the first and second hybrid coupler input signals. When the phase shifters phase-shift the first RF signal according to a 90 degree phase difference to generate the first and second hybrid coupler input signals, and when the amplitude shifters amplitude-shift the first RF signal according to first and second amplitudes to generate the first and second hybrid coupler input signals, the antenna transmit signals may be transmitted according to a split transmit diversity configuration. The first antenna transmit signal may comprise a first signal component of the first RF signal and the second antenna transmit signal may comprise a second signal component of the first RF signal.

In some examples, when the second amplitude is greater than zero, the antenna transmit signals may be transmitted according to an unequal split transmit diversity configuration. The first and second signal components of the first RF signal may be of unequal magnitude. When the second amplitude is substantially zero, the antenna transmit signals may be transmitted according to an equal split transmit diversity configuration. The first and second signal components of the first RF signal may be of equal magnitude. In some examples, the apparatus may further comprise processing circuitry to generate the first baseband signal based at least partly on a first packet of information bits and to generate the second baseband signal based at least partly on a second packet of information bits. In some examples, the first and second antennas may be further configured to receive first and second antenna receive signals. The apparatus may further comprise processing circuitry. The hybrid coupler may be configured to receive the hybrid coupler input signals from the phase shifters at first and second transmit input ports and may be further configured to send the antenna transmit signals from first and second transmit output ports to the antennas for transmission. The hybrid coupler may be further configured to receive the antenna receive signals at the transmit output ports and to send, from the transmit input ports, first and second hybrid coupler receive output signals to the processing circuitry. In some examples, the hybrid coupler may be configured to operate according to a bilateral configuration for reception of the antenna receive signals.

In some examples, the processing circuitry may be configured to determine a first summation that may comprise the first hybrid coupler receive output signal and may further comprise the second hybrid coupler receive output signal phase-shifted according to a predetermined digital hybrid coupler phase shift. The processing circuitry may be further configured to determine a second summation that may comprise the second hybrid coupler receive output signal and may further comprise the first hybrid coupler receive output signal phase-shifted according to the predetermined digital hybrid coupler phase shift. The processing circuitry may be further configured to determine, based on the first and second summation, one or more packets of receive information bits. In some examples, the tunable phase shifters may be coupled to a phase-locked loop (PLL) for phase-shifting of the RF signals for generation of the hybrid coupler input signals.

An example of a method of multi-antenna transmission is also disclosed herein. The method may comprise phase-shifting a radio frequency (RF) signal to generate first and second hybrid coupler input signals. The method may further comprise generating, for transmission on a first antenna, a first hybrid coupler output signal that may be based on a first summation that may comprise the first hybrid coupler input signal and may further comprise the second hybrid coupler input signal phase-shifted, by the hybrid coupler, according to a predetermined hybrid coupler phase shift. The method may further comprise generating, for transmission on a second antenna, a second hybrid coupler output signal that may be based on a second summation that may comprise the second hybrid coupler input signal and may further comprise the first hybrid coupler input signal phase-shifted, by the hybrid coupler, according to the hybrid coupler phase shift. In some examples, the RF signal may be phase-shifted by one or more tunable phase shifters coupled to a phase-locked loop (PLL) for the phase-shifting of the RF signal. In some examples, the predetermined hybrid coupler phase shift may be substantially 90 degrees. In some examples, when the RF signal is phase-shifted to generate a phase difference of positive 90 degrees for the first hybrid coupler input signal with respect to the second hybrid coupler input signal, a signal component of the RF signal may be included in the first hybrid coupler output signal and may be restricted from the second hybrid coupler output signal. When the RF signal is phase-shifted to generate a phase difference of negative 90 degrees for the first hybrid coupler input signal with respect to the second hybrid coupler input signal, the signal component of the RF signal may be included in the second hybrid coupler output signal and may be restricted from the first hybrid coupler output signal. In some examples, the method may further comprise amplitude-shifting, by one or more amplitude shifters, the RF signal to generate the hybrid coupler input signals. When the RF signal is amplitude-shifted to generate an amplitude of zero for the second hybrid coupler input signal, the first hybrid coupler output signal may comprise a first signal component of the RF signal and the second hybrid coupler output signal may comprise a second signal component of the RF signal. The second signal component may be based on the first signal component phase-shifted by a phase shift of substantially 90 degrees.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Front end module (FEM) circuitry, comprising:
   a hybrid coupler to generate a first antenna transmit signal and a second antenna transmit signal based on hybrid coupler input signals; and
   one or more tunable phase shifters to generate the hybrid coupler input signals based at least partly on an FEM input signal,
   wherein the first antenna transmit signal is based on a first signal summation that comprises summation of a first hybrid coupler input signal and a second hybrid coupler input signal phase-shifted, by the hybrid coupler, according to a predetermined hybrid coupler phase shift, and
   wherein the second antenna transmit signal is based on a second signal summation that comprises summation of the second hybrid coupler input signal and the first hybrid coupler input signal phase-shifted, by the hybrid coupler, according to the predetermined hybrid coupler phase shift.

2. The FEM circuitry according to claim 1, wherein the tunable phase shifters are coupled to a phase-locked loop (PLL) for phase-shifting of the FEM input signal for generation of the hybrid coupler input signals.

3. The FEM circuitry according to claim 1, wherein the FEM input signal comprises a radio frequency (RF) signal that is based on a baseband signal.

4. The FEM circuitry according to claim 1, wherein the predetermined hybrid coupler phase shift is substantially 90 degrees.

5. The FEM circuitry according to claim 4, wherein the tunable phase shifters are configured to phase-shift the FEM input signal to generate a phase difference of positive 90 degrees for the first hybrid coupler input signal with respect to the second hybrid coupler input signal, and a signal component of the FEM input signal is included in the first antenna transmit signal and is restricted from the second antenna transmit signal.

6. The FEM circuitry according to claim 5, wherein the tunable phase shifters are configured to phase-shift the FEM input signal to generate a phase difference of negative 90 degrees for the first hybrid coupler input signal with respect to the second hybrid coupler input signal, and the signal component of the FEM input signal is included in the second antenna transmit signal and is restricted from the first antenna transmit signal.

7. The FEM circuitry according to claim 4, wherein:
   the FEM circuitry further comprises one or more tunable amplitude shifters to adjust an amplitude of the FEM input signal to generate the hybrid coupler input signals, and
   the tunable amplitude shifters disable the second hybrid coupler input signal, and the first antenna transmit signal comprises a first signal component of the FEM input signal and the second antenna transmit signal comprises a second signal component of the FEM input signal, wherein the second signal component is based on the first signal component phase-shifted by a phase shift of substantially 90 degrees.

8. The FEM circuitry according to claim 7, wherein the disablement of the second hybrid coupler input signal comprises an amplitude-shifting of the FEM input signal to generate an amplitude of zero for the second hybrid coupler input signal.

9. The FEM circuitry according to claim 4, wherein:
   the hybrid coupler input signals generated by the tunable phase shifters are further based on a second FEM input signal, and
   the FEM input signal comprises a first radio frequency (RF) signal that is based on a first baseband signal and the second FEM input signal comprises a second RF signal that is based on a second baseband signal.

10. The FEM circuitry according to claim 9, wherein:
    the tunable phase shifters are configured to phase-shift the first FEM input signal by a first phase shift and phase-shift the second FEM input signal by a second phase shift that is 90 degrees behind the first phase shift, components of the first FEM input signal included in the first and second transmit antenna signals are phase-shifted according to a phase shift of positive 90 degrees with respect to each other, and components of the second FEM input signal included in the first and second transmit antenna signals are phase-shifted according to a phase shift of negative 90 degrees with respect to each other.

11. The FEM circuitry according to claim 1, wherein the tunable phase shifters are configured to phase-shift the FEM input signal based at least partly on feedback that comprises a phase difference between signal components of the first antenna transmit signal and the second antenna transmit signal.

12. A method of multi-antenna transmission, the method comprising:

phase-shifting a radio frequency (RF) signal to generate first and second hybrid coupler input signals;

generating for transmission on a first antenna, a first hybrid coupler output signal that is based on a first signal summation that comprises the first hybrid coupler input signal and the second hybrid coupler input signal phase-shifted, by the hybrid coupler, according to a predetermined by coupler phase shift, and generating for transmission on a second antenna, a second hybrid coupler output signal that is based on a second signal summation that comprises the second hybrid coupler input signal and the first hybrid coupler input signal phase-shifted, by the hybrid coupler, according to the predetermined hybrid coupler phase shift.

13. The method according to claim 12, wherein the RF signal is phase-shifted by one or more tunable phase shifters coupled to a phase-locked loop (PLL) for the phase-shifting of the RF signal.

14. The method according to claim 12, wherein the predetermined hybrid coupler phase shift is substantially 90 degrees.

15. The method according to claim 12, wherein:

the RF signal is phase-shifted to generate a phase difference of positive 90 degrees for the first hybrid coupler input signal with respect to the second hybrid coupler input signal, and a signal component of the RF signal is included in the first hybrid coupler output signal and is restricted from the second hybrid coupler output signal, and the RF signal is phase-shifted to generate a phase difference of negative 90 degrees for the first hybrid coupler input signal with respect to the second hybrid coupler input signal, and the signal component of the RF signal is included in the second hybrid coupler output signal and is restricted from the first hybrid coupler output signal.

16. The method according to claim 12, wherein:

the method further comprises amplitude-shifting by one or more amplitude shifters, the RF signal to generate the hybrid coupler input signals, wherein the RF signal is amplitude-shifted to generate an amplitude of zero for the second hybrid coupler input signal, and the first hybrid coupler output signal comprises a first signal component of the RF signal and the second hybrid coupler output signal comprises a second signal component of the RF wherein the second signal component is based on the first signal component phase-shifted by a phase shift of substantially 90 degrees.

* * * * *

UNITED STATES PATENT AND TRADEMARK OFFICE
CERTIFICATE OF CORRECTION

PATENT NO. : 10,171,126 B2
APPLICATION NO. : 14/841034
DATED : January 1, 2019
INVENTOR(S) : Chance et al.

It is certified that error appears in the above-identified patent and that said Letters Patent is hereby corrected as shown below:

On the Title Page

On page 2, in Column 1, under "Other Publications", Line 3, delete "PCT/US2018/047138," and insert --PCT/US2016/047138,-- therefor In the Claims In Column 21, Line 18, in Claim 12, after "generating", insert --,--

In Column 21, Line 23, in Claim 12, delete "by" and insert --hybrid-- therefor

In Column 21, Line 24, in Claim 12, after "generating", insert --,--

In Column 22, Line 21, in Claim 16, after "amplitude-shifting", insert --,--

In Column 22, Line 30, in Claim 16, after "RF", insert --signal,--

Signed and Sealed this
Fourteenth Day of April, 2020

Andrei Iancu
*Director of the United States Patent and Trademark Office*